United States Patent Office 3,772,240
Patented Nov. 13, 1973

3,772,240
SILICONE ELASTOMERS CONTAINING
BORIC ACID
Thomas W. Greenlee, Midland, Mich., assignor to Dow
Corning Corporation, Midland, Mich.
No Drawing. Filed June 18, 1971, Ser. No. 154,650
Int. Cl. C08g 51/04
U.S. Cl. 260—37 SB
14 Claims

ABSTRACT OF THE DISCLOSURE

Room temperature vulcanizable silicone elastomer compositions which vulcanize through the reaction of silicon-bonded hydroxyl radicals and silicon-bonded alkoxy radicals in the presence of a metal carboxylic acid salt having improved adhesion to metal when boric acid is present in the mixture.

This invention relates to a method of preparing room temperature vulcanizable silicone elastomer compositions with improved adhesion to metal and to the room temperature vulcanizable silicone elastomer compositions.

The use of boric acid and other boron compounds have been known in the silicone art to provide some special property. One use of boric acid and alkyl borates is the condensation of polymeric diorganosiloxane compounds containing silicon-bonded hydroxyl radicals with or without alkoxy containing silicon compounds. This condensation results in a material known as bouncing putty which is a fluid material exhibiting rebound elasticity but devoid of cohesion when flexed and is thus not a true elastomer. The use of boric acid in the manufacturing of silicone rubber gum stocks has been known to provide improved handling properties which enhances the extrusion properties. The alkyl borates have also been used to provide auto-adhering silicone rubber.

Unexpectedly, it was found that boric acid in room temperature vulcanizable silicone elastomer compositions which vulcanize by reaction of silicon-bonded hydroxyl radicals with silicon-bonded alkoxy radicals provided a silicone elastomer with improved adhesion to metals. It was even more surprising when it was found that alkyl borates did not improve the adhesion to metal when used in these silicone rubber compositions.

It is, therefore, an object of this invention to provide a method for making room temperature vulcanizable silicone elastomer compositions with improved adhesion to metal and to provide the composition which has this property.

This invention relates to a method of preparing a room temperature vulcanizable silicone elastomer composition having improved adhesion to metal comprising adding boric acid to a room temperature vulcanizable silicone elastomer composition which vulcanizes through the reaction of silicon-bonded hydroxyl radicals and silicon-bonded alkoxy radicals in the presence of a metal salt of a carboxylic acid.

The room temperature vulcanizable silicone elastomer compositions are well known in the art and are available commercially. These room temperature vulcanizable silicone elastomer compositions comprise ingredients which have silicon-bonded hydroxyl radicals and silicon-bonded alkoxy radicals which react in the presence of a metal carboxylic acid salt to vulcanize the composition to an elastomer. These compositions comprise a hydroxyl end-blocked polydiorganosiloxane fluid, an alkoxy silicon compound and a metal salt of a carboxylic acid. The alkoxy silicon compounds include alkoxysilanes, alkyl silicates, reaction product of a tin salt of a carboxylic acid and an alkyl silicate, bis(alkoxysilyl) hydrocarbon compound, polyvinylalkoxysilane, alkoxydisilanes, cellosolvoxysilanes, and liquid partial hydrolyzates thereof. Additional details can be found in the following patents, U.S. Pat. Nos. 2,843,555 by Berridge, 2,902,467 by Chipman, 2,927,907 by Polmanteer, 3,065,194 by Nitzsche et al., 3,109,826 and 3,110,689 by Smith, 3,127,363 by Nitzsche et al., 3,154,515 by Berridge, 3,165,494 by Smith, 3,186,-963 by Lewis et al., 3,305,502 by Lampe and Canadian Pat. No. 772,677 by Tarno.

The hydroxyl endblocked polydiorganosiloxane fluids have organic radicals having from 1 to 18 inclusive carbon atoms selected from monovalent hydrocarbon radicalss and halogenated monovalent hydrocarbon radicals, preferably at least 50 percent of the organic radicals are methyl radicals and the viscosity is preferably from 1000 to 100,000 cs. at 25° C. The most preferred organic radicals are methyl, phenyl, ethyl, vinyl and 3,3,3-trifluoroproyl. These hydroxyl endblocked polydiorganosiloxane fluids are well known in the art and additional details can be found in the above U.S. patents which are hereby incorporated by reference.

The alkoxysilicon compounds include the types described above such as the tetraalkoxysilanes, such as tetraethoxysilane, tetra-n-propoxysilane, tetrapentoxysilane, methoxytriethoxysilane, diethoxydipropoxysilane and tetrahexoxysilane, the alkylpolysilicates such as ethylpolysilicate, isopropylpolysilicate, n-butylpolysilicate, n-propylpolysilicate, alkoxysilanes such as methyltrimethoxysilane, ethyltriethoxysilane, vinyltriethoxysilane, phenyltrimethoxysilane, 3,3,3 - trifluoropropyltrimethoxysilane, phenyltributoxysilane and liquid partial hydrolyzates thereof. These and many other alkoxy silicon compounds are well known to the art and additional details can be obtained from the above U.S. patents which are hereby incorporated by reference. Preferably, the alkoxysilicon compounds are tetraalkoxysilanes or alkylpolysilicates where the alkyl radical has from 1 to 3 inclusive carbon atoms.

The metal salts of carboxylic acids can be illustrated by dibutyltindiacetate, dibutyltindilaurate, lead naphthenate, cobalt naphthenate, zinc naphthenate, iron 2-ethylhexoate, lead 2-ethylhexoate, chromium octoate, dibutyltin dibenzoate, dibutyltin adipate, dibutyltin dilactate, lead octoate, stannous octoate, tin ricinoleate, dioctyltin monoacetate, and other metal salts of carboxylic acids which are well known in the art as illustrated by the U.S. patents cited above which are hereby incorporated by reference to provide additional details. The preferred metal salts of carboxylic acids are the tin salts.

When boric acid is added to a room temperature vulcanizable silicone elastomer composition as described above, the resulting composition provides increased adhesion to metals, the increased adhesion being observed when the composition cures to an elastomer in contact with a metal, such as aluminum, steel, iron, magnesium, titanium and the like.

Since the ingredients of the above described composition react at ambient temperatures to vulcanize the composition to an elastomer, it is preferable to store the ingredients in at least two separate packages until cure is desired. One preferred two package system, which is storable, is a first composition which comprises the hydroxyl endblocked polydiorganosiloxane fluid and the metal salt of a carboxylic acid and a second composition which comprises boric acid and the silanes and liquid partial hydrolyzates of the silanes which have the silicon-bonded alkoxy radicals. These two compositions are stable when stored in separate packages, however, when cure is desired the two compositions are mixed to provide the room temperature vulcanizable silicone elastomer composition. Filler can be present in either one or both compositions, preferably in the first composition. Also it is preferred to have present in the second composition some triorganosiloxy endblocked polydiorganosiloxane fluid to assist in the even distribution of the ingredients of the two compositions. The two compositions in separate packages can be of such proportions as would be conventionally used in the art to make a room temperature vulcanizable silicone elastomer composition. Therefore, the separate compositions when mixed preferably provide based on 100 parts by weight of the hydroxyl endblocked polydiorganosiloxane fluid, 0.5 to 10 parts by weight of the alkoxy bearing compound, 0.1 to 5 parts by weight of the metal salt of a carboxylic acid and additionally in this invention from 0.5 to 5 parts by weight of boric acid. Thus, the amount of the first composition to be mixed with the second composition will be determined by the amounts of the ingredients in each of the separate packages.

The two compositions are mixed and then applied to a metal surface and after vulcanizing the bond between the cured silicone elastomer and the metal is improved over the same composition without boric acid.

Alternatively, the two separate packages can comprise as storable compositions, a first composition comprising the hydroxyl endblocked polydiorganosiloxane fluid and the silanes and liquid partial hydrolyzates of the silanes which have the silicon-bonded alkoxy radicals, and a second composition comprising boric acid and the metal salt of a carboxylic acid. As described above, either of the two compositions can contain filler, preferably the first composition. A trioganosiloxy endblocked polydiorganosiloxane fluid can also be present, preferably in the second composition. These separate packaged compositions are mixed to provide a room temperature vulcanizable silicone elastomer composition wherein the amounts are preferably as described above.

The compositions of the present invention are useful as room temperature vulcanizable silicone elastomers and have the added advantage that the elastomer cured to metal surfaces has improved adhesion to the metal surface even when no primer is used on the metal surface compared to the same room temperature vulcanizable silicone elastomer composition without boric acid.

The following examples are illustrative only and should not be construed as limiting the present invention which is properly delineated in the claims.

EXAMPLE 1

Three compositions were prepared by milling 100 parts by weight of a hydroxyl endblocked polydimethylsiloxane having a viscosity of about 12,500 cs. at 25° C. and 20 parts by weight of a fume silica filler having a surface area of 250 m.²/g. and a trimethylsiloxy treated surface. The milled composition was then mixed with 3 parts by weight of ethylorthosilicate, 0.25 part by weight of dibutyltin diacetate and an additive as shown in the table.

The adhesion was determined using aluminum panels and aluminum foil strips. These were cleaned by scrubbing with a detergent, rinsing with tap water, soaking for 15 minutes in deionized water, rinsing with acetone, drying, scrubbing with trichloroethylene and drying. The compositions were applied to the clean foil strips and the coated side of the foil strips were laid on the clean aluminum panels. The assembly was then rolled to obtain an even thickness. The samples were then allowed to cure in sealed plastic bags for two days partial hydrolyzates of the silanes which have the sili- The samples were then removed from the bags and allowed to cure for seven days at room temperature exposed to air. A commercial tester was used to measure the peel strengths. Peel tests were 180° C. at two inches per minute, jaw separation rate. The adhesion results for the elastomers were as shown in the following table:

| Additive | Amount | Peel strength, p.l.i. |
|---|---|---|
| None | | 0.5–1 |
| $H_3BO_3$ | 1.0 | 10.0 |
| $B(OCH_3)_3$ | 1.0 | 0.7 |

EXAMPLE 2

(A) A composition was prepared by mixing 100 parts by weight of the hydroxyl endblocked polydimethylsiloxane as described in Example 1, 30 parts by weight of the silica filler as described in Example 1 and 0.25 part by weight of dibutyltin diacetate.

(B) A composition was prepared by mixing 69.2 parts by weight of a trimethylsiloxy endblocked polydimethylsiloxane having a viscosity of 12,500 cs. at 25° C., 7.7 parts by weight boric acid and 23.1 parts by weight of ethylorthosilicate.

(C) The composition described in Example 1 was viscous and of a bouncing putty nature and not easy to handle. To provide better handling, the composition was separated into two packages as described in (A) and (B) above. Compositions of (A) and (B) remained stable when stored under anhydrous conditions and when mixed provided a room temperature vulcanizable silicone elastomer composition. Ten parts by weight of mixture (A) was mixed with one part by weight of mixture (B). The adhesion was then tested as described in Example 1. The peel strength was 14 p.l.i. The adhesive test was again repeated after the cured test panels were immersed in deionized water for 28 days at room temperature. The peel strength after the immersion was 12 p.l.i. This cured silicone elastomer did not exhibit auto adhesive properties.

EXAMPLE 3

(A) A composition was prepared by mixing 100 parts by weight of the hydroxyl endblocked polydimethylsiloxane as described in Example 1, 30 parts by weight of the silica filler as described in Example 1 and 3 parts by weight of ethylorthosilicate.

(B) A composition was prepared by mixing 60.9 parts by weight of a trimethylsiloxy endblocked polydimethylsiloxane as described in Example 2(B), 5.0 parts by weight of boric acid and 0.7 part by weight of dibutyltin diacetate.

(C) A room temperature vulcanizable silicone elastomer composition was prepared by mixing 10 parts by weight of composition (A) above and 1 part by weight of composition (B). The resulting composition was tested as described in Example 1 for adhesion. The peel strength was 15 p.l.i. with 100 percent cohesive failure. To determine the stability of the separate packages, compositions (A) and (B) were heated for 33 days at 73 to 75° C. Composition (A) increased only slightly in viscosity and composition (B) remained unchanged. After the heating these were mixed as described above and tested for adhesion as described in Example 1. The peel strength was 13 p.l.i. This cured silicone elastomer did not exhibit auto-adhesive properties.

That which is claimed is:

1. A method of preparing a room temperature vulcanizable silicone elastomer composition having improved adhesion to metal comprising adding 0.5 to 5 parts by weight boric acid based on 100 parts by weight of hydroxyl endblocked polydiorganosiloxane fluid to a room temperature vulcanizable silicone elastomer composition comprising a hydroxyl endblocked polydiorganosiloxane fluid which vulcanizes through the reaction of silicon-bonded hydroxyl radicals and silicon-bonded alkoxy radicals in the presence of a metal salt of a carboxylic acid.

2. The method according to claim 1 in which the silicon-bonded hydroxyl radicals are derived from hydroxyl endblocked polydiorganosiloxane fluids and the silicon-bonded alkoxy radicals are derived from silanes and liquid partial hydrolyzates of the silanes.

3. The method according to claim 2 in which two separate, storable, time-stable compositions are mixed to provide the room temperature vulcanizable silicone elastomer composition where a first composition comprises the hydroxyl endblocked polydiorganosiloxane fluid and the metal salt of a carboxylic acid and a second composition comprises boric acid and the silanes and liquid partial hydrolyzates of the silanes which have the silicon-bonded alkoxy radicals.

4. The method according to claim 3 in which the first composition also contains a filler and the second composition contains a triorganosiloxy endblocked polydiorganosiloxane fluid.

5. The method according to claim 4 in which the mixture of the first composition and the second composition provide per 100 parts by weight of the hydroxyl endblocked polydiorganosiloxane fluid, 0.5 to 10 parts by weight of the alkoxy bearing compounds, 0.5 to 5 parts by weight of boric acid and 0.1 to 5 parts by weight of the metal salt of a carboxylic acid.

6. The method according to claim 5 in which the resulting mixture is applied to a metal surface and thereafter allowed to vulcanize whereby an adhesive bond is formed between the vulcanized silicone elastomer and the metal.

7. The method according to claim 2 in which two separate, storable, time-stable compositions are mixed to provide the room temperature vulcanizable silicone elastomer composition where a first composition comprises the hydroxyl endblocked polydiorganosiloxane fluid and the silanes and liquid partial hydrolyzates of the silanes which have the silicon-bonded alkoxy radicals and a second composition comprises boric acid and the metal salt of a carboxylic acid.

8. The method according to claim 7 in which the first composition also contains a filler and the second composition contains a triorganosiloxy endblocked polydiorganosiloxane fluid.

9. The method according to claim 8 in which the mixture of the first composition and the second composition provide per 100 parts by weight of the hydroxyl endblocked polydiorganosiloxane fluid, 0.5 to 10 parts by weight of the alkoxy bearing compounds, 0.5 to 5 parts by weight of boric acid and 0.1 to 5 parts by weight of the metal salt of a carboxylic acid.

10. A room temperature vulcanized silicone elastomer composition prepared by mixing
    (1) 100 parts by weight of a hydroxyl endblocked polydiorganosiloxane fluid,
    (2) from 0.5 to 10 parts by weight of an alkoxy silicon compound selected from the group consisting of silanes, liquid partial hydrolyzates of the silanes and mixtures thereof,
    (3) from 0.5 to 5 parts by weight of boric acid, and
    (4) from 0.1 to 5 parts by weight of a carboxylic acid salt of tin.

11. The room temperature vulcanized silicone elastomer composition in accordance with claim 10 in which a filler is present.

12. The room temperature vulcanized silicone elastomer composition in accordance with claim 10 in which a triorganosiloxy endblocked polydiorganosiloxane is present.

13. The room temperature vulcanized silicone elastomer in accordance with claim 11 in which the alkoxysilicon compound of (2) is tetraethoxysilane.

14. The room temperature vulcanized silicone elastomer in accordance with claim 13 in which the carboxylic acid salt of tin is dibutyltin diacetate.

References Cited

UNITED STATES PATENTS

| | | | |
|---|---|---|---|
| 3,050,491 | 8/1962 | Nitzsche et al. | 260—18 S X |
| 2,721,857 | 10/1955 | Dickmann | 260—37 SB UX |

LEWIS T. JACOBS, Primary Examiner

U.S. Cl. X.R.

260—18 S, 46.5 E